Figure 5:
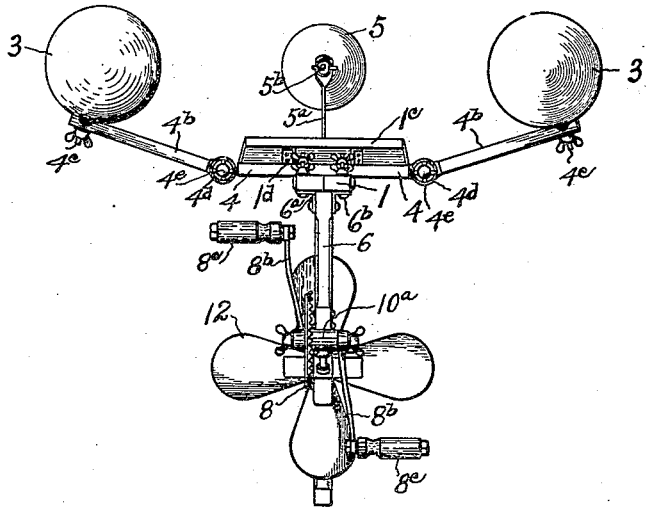

G. G. ALLENBAUGH.
SWIMMING DEVICE.
APPLICATION FILED AUG. 31, 1921.
1,422,071.
Patented July 11, 1922.
4 SHEETS—SHEET 1.
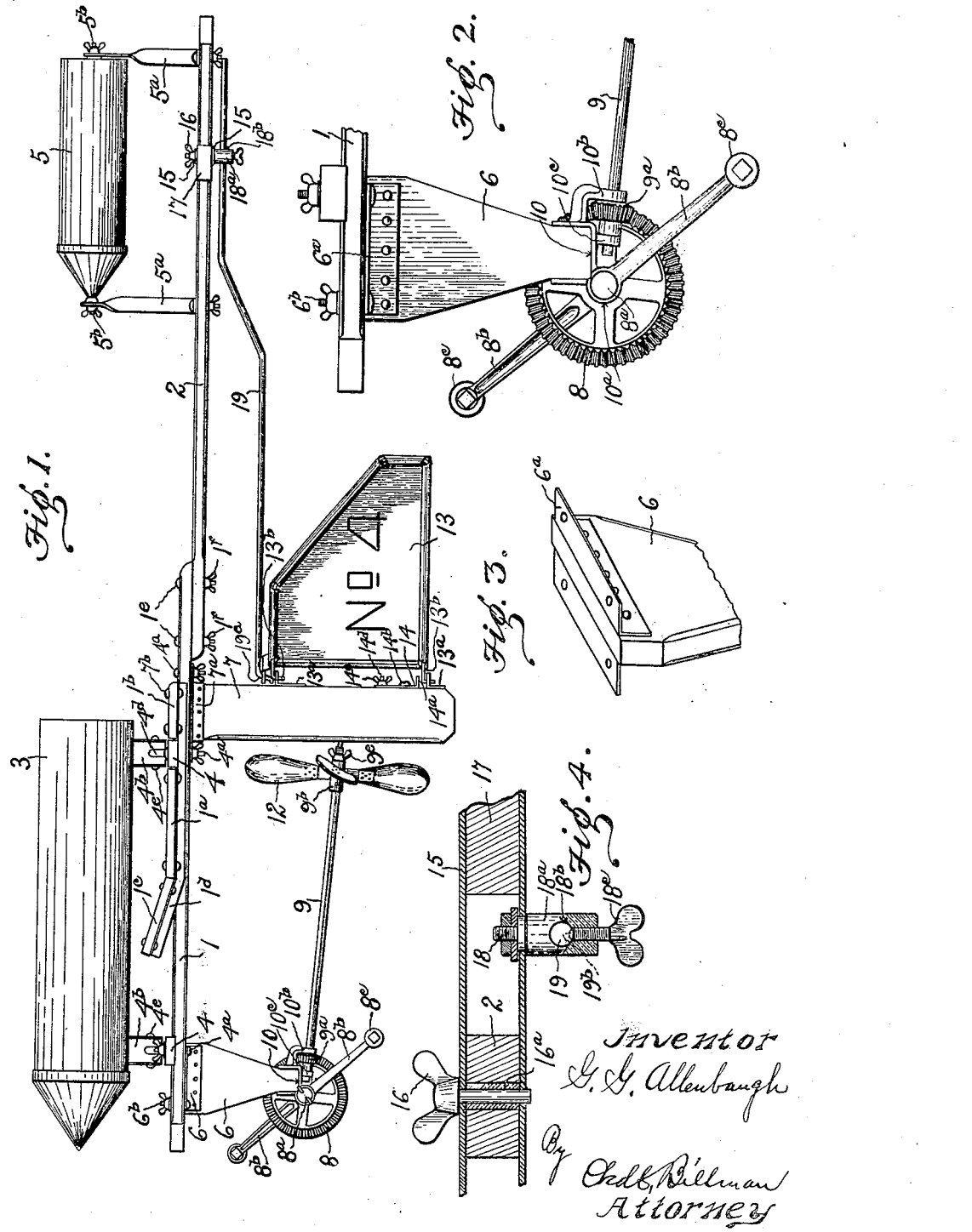
Inventor
G. G. Allenbaugh
By
Attorney

G. G. ALLENBAUGH.
SWIMMING DEVICE.
APPLICATION FILED AUG. 31, 1921.

1,422,071. Patented July 11, 1922.
4 SHEETS—SHEET 2.

Inventor
G. G. Allenbaugh

By
Orth Billman
Attorney

G. G. ALLENBAUGH.
SWIMMING DEVICE.
APPLICATION FILED AUG. 31, 1921.
1,422,071.
Patented July 11, 1922.
4 SHEETS—SHEET 3.
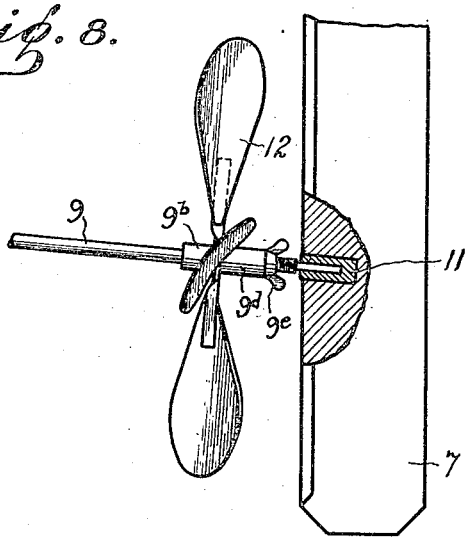
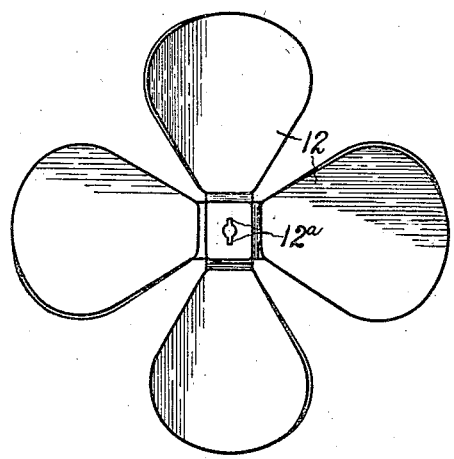
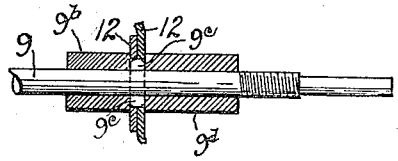

G. G. ALLENBAUGH.
SWIMMING DEVICE.
APPLICATION FILED AUG. 31, 1921.

1,422,071. Patented July 11, 1922.
4 SHEETS—SHEET 4.

Inventor
G. G. Allenbaugh

By Chas. E. Billman
Attorney.

UNITED STATES PATENT OFFICE.

GEORGE GAIL ALLENBAUGH, OF MANSFIELD, OHIO.

SWIMMING DEVICE.

1,422,071.   Specification of Letters Patent.   Patented July 11, 1922.

Application filed August 31, 1921. Serial No. 497,096.

*To all whom it may concern:*

Be it known that I, GEORGE GAIL ALLENBAUGH, a citizen of the United States, residing at Mansfield, in the county of Richland and State of Ohio, have invented certain new and useful Improvements in Swimming Devices, of which the following is a specification.

My invention relates to improvements in swimming devices, and more particularly to that class or type which are designed for individual suspension in and propulsion through the water, the present embodiment of the invention being particularly designed and adapted for use as an amusement device at bathing beaches, and the like.

The primary object of the invention is to provide a generally improved portable and collapsible device of this class which will be exceedingly simple in construction, cheap of manufacture and efficient in use.

A further and very important object is the provision of a device of this class in which the propeller mechanism is operated by the hands of the operator or swimmer and the steering mechanism is controlled by the feet.

A further object is the provision of an improved knock-down device of this class which may be readily assembled or disassembled without the use of wrenches or other tools and in which the parts may be readily adjusted to conform to the size or length of the particular operator or swimmer desiring to use the same and in which the floats or buoyant members may be readily adjusted to meet the demands or requirements of the particular user.

With the above mentioned and other ends in view, the invention consists in the novel construction, arrangement, and combination of parts, illustrated in one of its embodiments in the accompanying drawings, and particularly pointed out in the appended claims.

Referring to the drawings, forming a part of this specification, Figure 1, is a side elevation of a swimming device or machine, constructed in accordance with this invention, the parts being shown in their assembled positions for use, the near forward float being removed.

Fig. 2, an enlarged side elevation of a hand operable propeller gear mechanism carried beneath the front of the main frame.

Fig. 3, a perspective view of the front or gear supporting members and illustrating in particular the attaching brackets for securing the same beneath the front portion of the main frame.

Fig. 4, an enlarged fragmentary sectional view of the foot-operated steering bar and illustrating in particular the means for adjustably connecting the steering bar to the rudder.

Fig. 5, a front elevation of the improved swimming device.

Figure 6:
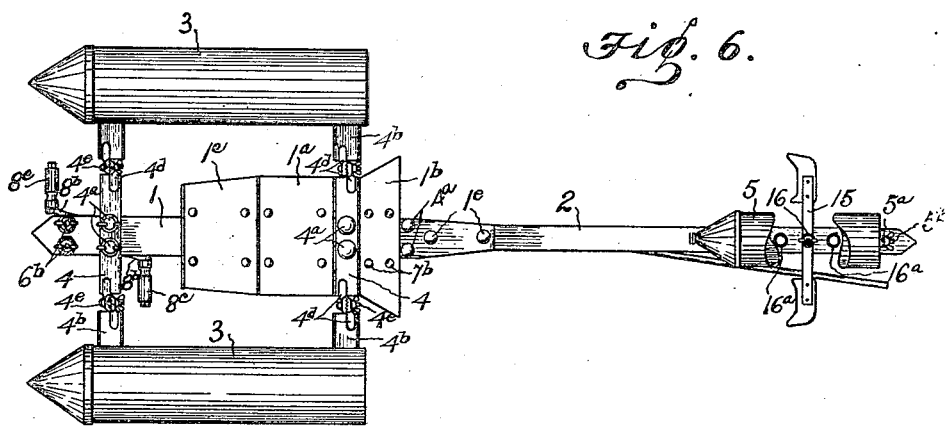

Fig. 6, a top plan view of the same, a portion of the rear float or tank being broken away for the purpose of clearer illustration of the foot operated cross-bar for controlling the rudder.

Figure 7:
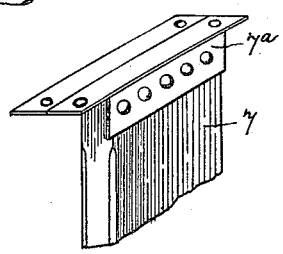

Fig. 7, an enlarged fragmentary perspective view of the upper or bracket portion of the rear pendant or propeller and rudder carrying bar attached beneath the rear portion of the main frame.

Fig. 8, an enlarged side elevation of the propeller and propeller shaft, a portion of the rear bar being broken away to show the mounting of the propeller shaft therein.

Fig. 9, a rear view of the propeller detached from the propeller shaft.

Fig. 10, a longitudinal sectional view of the propeller and propeller shaft illustrating the manner of securing the propeller blades upon the propeller shaft, the locking wing nut being removed.

Figure 11:
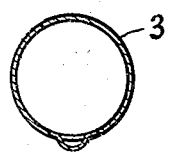

Fig. 11, a cross sectional view of one of the float tanks or buoyant members detached.

Figure 12:
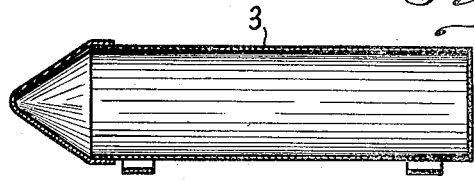

Fig. 12, a central longitudnal sectional view of the same.

Figure 13:
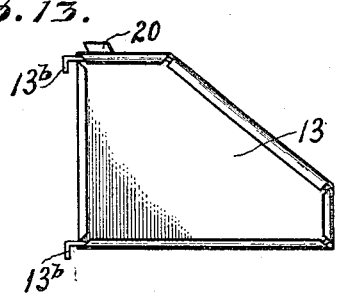

Fig. 13, a side elevation of the rudder member, detached.

Figure 14:

Fig. 14, a cross sectional view of the same.

Figure 15:
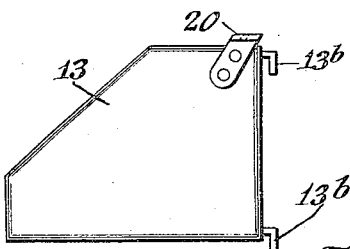

Fig. 15, a side elevation of the opposite side of the rudder, detached.

Figure 16:
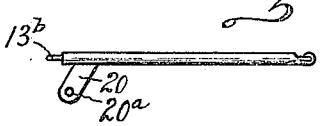

Fig. 16, an edge view of the rudder taken from the lower side of same.

Figure 17:
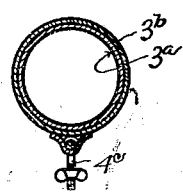

Fig. 17, a cross sectional view of a modified form of float or buoyant member, detached.

Figure 18:
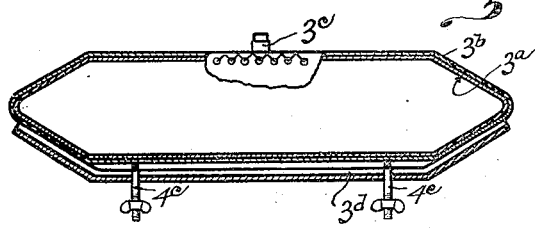

Fig. 18, a longitudinal sectional view of the same.

Figure 19:
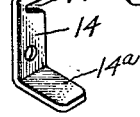

Fig. 19, a perspective view of the keeper plate or bracket for detachably securing the rudder to the rear pendant propeller and rudder supporting bar.

Similar numerals of reference designate like parts throughout all the figures of the drawings.

The improved swimming machine or device comprises a main frame 1, and a steering or tail frame 2, said main and tail frames 1 and 2 consisting, in the present instance, of a longitudinally extending bar 1, and a second or tail bar 2. As a means of suitably supporting the body of the operator or swimmer upon the main frame 1, the latter is preferably provided with a transverse board $1^a$, a hip board $1^b$, and a breast board $1^c$, the latter being preferably upwardly inclined by means of bracket members $1^d$, as shown most clearly in Figs. 1 and 5 of the drawings.

As a means of readily and quickly disassembling or assembling the parts without the use of wrenches or other special tools all of the various connected parts are connected and held together by means of bolts provided with wing-nuts and with this end in view, the main frame bar 1, and the steering or tail bar 2 are connected by means of bolts $1^e$, and wing-nuts $1^f$.

As a means of providing sufficient buoyancy to the main and tail frames, as well as maintaining the parts in proper position during the propelling and steering operation by the operator, suitable floats or buoyant members are provided, said floats preferably comprising hollow air tight tanks or receptacles suitably supported as now described.

The floats or buoyant members 3, for the main frame are preferably adjustably mounted and supported by means of relatively fixed cross bars 4, secured to the main frame bar 1, by means of bolts $4^a$ provided with wing-nuts and adjustable float supporting arms $4^b$, the latter being detachably connected at their free ends to the floats 3, by means of bolts $4^c$, connected to the tanks and secured by means of wing-nuts in the usual manner.

As a convenient means of connecting and adjusting the bars 4 and $4^b$, to each other and particularly as a means of securing the latter in any desired angle or inclination the adjacent ends of said bars are provided with coupling or hinge lugs $4^d$, said lugs being provided on their inner abutting face sides with teeth adapted to interlock with each other when drawn up by means of the hinge bolts $4^e$, provided with the usual wing-nuts of the form hereinbefore described.

The rear end of the steering or tail frame bar 2, is provided with a superposed float 5, supported, in the present instance, by means of upwardly extending bars or brackets $5^a$, the latter being detachably connected to the ends of the float 5 by means of bolts $5^b$, and wing-nuts.

As a means of providing suitable propeller gearing and propeller and steering mechanism beneath the supporting main and tail frames or bars 1 and 2, the main frame bar 1 is provided on its under side with suitable pendant supporting bars 6 and 7, said front bar 6 being adapted to support suitable hand driven gearing for the propeller hereinafter referred to, and said rear pendant bar or support being adapted to support the rear end of the propeller shaft and the steering rudder as hereinafter referred to. As a means of detachably connecting the front and rear supporting bars 6 and 7, the latter are provided at their tops with bracket members $6^a$ and $7^a$, respectively, adapted to be secured by means of the bolts $6^b$ and $4^a$, and the usual wing-nuts. The hip board $1^b$ is secured to the main frame 1 by rivets $7^b$.

The propeller driving gearing comprises a bevel gear 8 carried on a bearing shaft $8^a$, the latter being provided with crank arms $8^b$, provided with suitable handles $8^c$, for operation by the hands of the operator.

As a means of supporting the bearing shaft $8^a$, and the front end of the propeller shaft 9, the lower end of the front pendant bar 6, is provided with a bearing bracket 10, the front end of said bracket 10 being provided with a bearing head $10^a$, to support the shaft $8^a$, and the rear end being provided with a branch arm terminating in the bearing head $10^b$, a third bearing head $10^c$, being adapted to receive the front end of the propeller shaft and said heads or arms $10^b$ and $10^c$ acting to retain the bevel gear $9^a$, keyed upon the propeller shaft and meshing with the bevel gear 8.

As a means of mounting the rear end of the propeller shaft and supporting the same in a suitable manner a bearing block 11, (see Fig. 8) is mounted in the front edge of the rear pendant bar 7, and as a means of securing the propeller blade 12 on the shaft 9, the latter is provided at its rear end with a relatively fixed bearing sleeve $9^b$, adjacent to a cross pin forming oppositely arranged projections $9^c$, adapted to receive and take into the oppositely arranged keyways or slots $12^a$ of the propeller blade (see Figs. 9 and 10). As a means of removably securing the propeller blade 12 in position in interlocking relation with the projections $9^c$, a second or loose sleeve $9^d$, is provided, said sleeve being secured in position by means of a wing-nut $9^e$, threaded on the threaded portion of the rear end of the propeller shaft.

As a means of guiding or steering the improved machine or device, the rear edge of the rear bar 7 is provided with hinge brackets $13^a$, having openings adapted to removably receive hinge hooks $13^b$, of a rudder 13, and as a means of quickly attaching or detaching the latter a keeper plate 14 is mounted on the rear edge of the bar 7, said keeper plate 14 being provided with a rearwardly extending bracket portion 14ª adapted to normally rest just above the lower hinge hook 13ᵇ, and being pivotally mounted by means of a pivot screw 14ᵇ, and as a means of permitting such keeper plate to be swung on the pivot screw 14ᵇ, the upper portion of the keeper plate is provided with a hook shaped recess 14ᶜ, adapted to pass over a bolt 14ᵈ, anchored in the rear side of the bar 7 and provided with a wing-nut 14ᵉ.

As a means of operating the rudder 13 by the feet of the operator or swimmer, the rear or tail frame 2 is provided with a pivotally mounted cross bar, said foot operated cross bar 15 being adjustably secured with respect to the operator by means of a winged pivot bolt 16, adapted to be secured in varying positions in the series of bearing openings 16ª, in the tail bar 2. The foot operated cross bar 15 is preferably made up of upper and lower pieces of sheet metal spaced apart as shown most clearly in Fig. 4 of the drawings and adapted to receive suitable wooden foot pedals or rests 17.

As a means of connecting the cross bar 15 to the rudder 13, the cross bar is provided at one side with a connecting bolt 18 (in the present instance the lower sheet metal member thereof as shown in Fig. 4) carrying a swivel block 18ª, said block being provided with an opening 18ᵇ, to adjustably receive and contain the rear end of a connecting rod 19, the latter terminating at its front in a hooked portion 19ª, extending into an opening 20ª, of a bracket arm 20 (see Figs. 1 and 16 of the drawings), so that when the foot operated steering cross bar is rocked on the pivot bolt 16, the rudder will be correspondingly actuated, that is to say, when the foot pedal to the right is moved rearwardly the rear end of the rudder will move to the right and the device will be correspondingly moved to the right.

As a means of adjusting the connecting rod 19, when the steering cross bar 15 is adjusted, the lower side of the rear end of the rod 19 is provided with a series of notches 19ᵇ, in which the clamping wing bolt 18ᶜ, of the swivel block 18ª is adapted to engage.

In the form of float shown in Figs. 17 and 18 of the drawings the float is made up of flexible inner and outer walls 3ª and 3ᵇ, respectively, the inner wall being of flexible inflatable material such as rubber or the like, and the outer wall 3ᵇ, preferably comprising a canvas covering having a slit or opening near its center to receive the inner flexible receptacle similar to an ordinary foot-ball and provided with a filling nozzle or valve 3ᶜ. The lower portion of the outer covering is preferably provided with a reenforcing bar 3ᵈ, to which the attaching bolts 4ᶜ, are adapted to be attached.

Having thus described one of the embodiments of my invention, without having attempted to set forth all the forms in which it may be made, or all the modes of its use, what I claim and desire to secure by Letters Patent, is,—

1. A swimming device, comprising a main frame, a steering frame, buoyant members on said frames, subjacent propeller and rudder mechanism on said main frame, and foot operated steering mechanism on said steering frame connected to said rudder mechanism.

2. In a swimming device, a buoyant collapsible frame provided with subjacent propeller and rudder mechanism beneath its median portion, and hand operated gearing at the front portion of said frame for operating said propeller and a foot operated lever for controlling said rudder mechanism.

3. In a swimming device, a collapsible frame adapted to support a swimmer, buoyant members adjustably connected to the sides of said frame, screw propeller and rudder mechanism beneath the intermediate portion of said collapsible frame, hand operated driving mechanism for said screw propeller at the front portion of said frame, and foot operated lever and link mechanism at the rear, adjustably connected to said frame and rudder mechanism.

4. A swimming device, comprising a main frame including body supporting members, and depending supporting members, adjustably mounted floats at the sides of said main frame, propeller gear and propeller and rudder mechanism on said depending supporting members, a tail frame on said main frame and provided with a superposed float, and a foot operated steering bar on said tail frame connected with said rudder mechanism.

5. A swimming device, comprising a main frame including pendant supporting bars, gear and propeller and rudder mechanism carried by said supporting bars, float supporting bars adjustably mounted and extending from the sides of said main frame, a tail bar detachably connected to said main frame and provided with a superposed float, a foot operated steering bar on said tail bar, and a connecting bar extending from said steering bar and connected to said rudder mechanism.

6. A swimming device, comprising a main frame including detachable pendant front and rear supporting bars, propeller driving gears including hand cranks carried by said front supporting bars, propeller and rudder mechanism carried by said rear supporting bar, float supporting bars adjustably mounted on and extending from the sides of said main frame, a tail bar detachably connected to said main frame and provided with a superposed float, a foot operated steering bar adjustably mounted on said tail bar, and a connecting bar adjustably connected to said steering bar and said rudder mechanism.

7. A swimming device, comprising a main frame including breast and hip boards and pendant front and rear bars, hand operated propeller driving mechanism carried by said front pendant bar, propeller and rudder mechanism carried by said rear pendant bar, floats adjustably mounted on and extending from said main frame, a tail connected to said main frame and provided with a superposed float, a foot operated steering bar on said tail, and a connecting bar connected to said steering bar and said rudder mechanism.

8. A swimming device, comprising a main frame provided with laterally extending detachably and adjustably connected float carrying bars, floats connected to the ends of the latter, a tail bar detachably connected to said main frame, a superposed tail float, subjacent propeller and rudder mechanism, propeller driving gearing beneath the front portion of said main frame provided with handles adapted to be driven by the hands of the operator, a foot operated steering bar on said tail bar, and a connecting rod extending between said foot operated cross bar and rudder mechanism whereby the latter may be operated.

9. A swimming device, comprising a main frame provided with laterally extending adjustably connected float carrying bars, floats detachably connected to the ends of the latter, a steering or tail frame bar detachably connected to said main frame and provided with a superposed float, subjacent propeller and rudder mechanism on said main frame, propeller driving gearing beneath the front portion of said main frame and provided with handles adapted to be driven by the hands of the swimmer, a foot operated steering bar on said tail frame bar, and a connecting rod extending from said foot operated cross bar to said rudder mechanism whereby the latter may be operated.

In testimony whereof I have affixed my signature.

GEORGE GAIL ALLENBAUGH.